United States Patent Office 3,522,285
Patented July 28, 1970

3,522,285
STABLE LIQUID POLYISOCYANATE COMPOSITIONS
Voldemar Kirss, Buffalo, N.Y., assignor to Allied Chemical Corporation, New York, N.Y., a corporation of New York
No Drawing. Continuation-in-part of application Ser. No. 463,360, June 11, 1965. This application Apr. 4, 1969, Ser. No. 813,771
Int. Cl. C07c 85/10, 119/04; C08a 22/46
U.S. Cl. 260—453          4 Claims

ABSTRACT OF THE DISCLOSURE

Polyisocyanate compositions are provided which do not deposit sediment and which do not undergo pronounced variations in their viscosities on prolonged storage by phosgenoting a mixture of toluenediamines containing less than 1.5 weight percent of ortho toluenediamines.

---

This application is a continuation-in-part of application Ser. No. 463,360, filed June 11, 1965, now abandoned.

This invention relates to novel polyisocyanate compositions derived by the phosgenation of toluenediamines and to a process for manufacturing the same.

Toluenediamine phosgenation products comprising tolylene diisocyanate solutions of congeneric non-volatile polyisocyanate solutes, said phosgenation products having an amine equivalent range between about 98 and about 120 and a viscosity range between about 20 and about 10,000 cps. at room temperature, are well-known products finding an increasing number of applications in the urethane polymer field. Such products are referred to by Ferrigno in "Rigid Plastic Foams," Reinhold Publishing Corporation, 1963, at pages 5 to 10. Other such products are disclosed in French Pat. 1,375,975 wherein toluenediamine phosgenation products are prepared by reacting a mixture of toluenediamines derived by reduction of a dinitration product of toluene with phosgene in the presence of an inert diluent and then distilling solvent and tolylene diisocyanate from the reaction mixture until a distilland is obtained comprising a tolylene diisocyanate solution of congeneric polyisocyanate solutes, said solution having an amine equivalent and a viscosity within the ranges specified above.

Such products, while being eminently valuable, nevertheless possess certain undesirable characteristics. For example on storage, such products deposit, on standing, in certain cases in a matter of days, solid sediments which detract from the physical appearance of the polyisocyanates and preclude their use in foaming operations without further processing to render the suspensions homogeneous. The presence of sediments in such polyisocyanate compositions is undesirable since solid particles interfere with optimum operation of foam producing machines. In addition, the presence of solid particles in such polyisocyanate compositions affects adversely the physical and chemical characteristics of urethane foam polymers prepared therefrom in that such foams are generally of an irregular cell structure and possess a non-uniform cross-sectional area. Furthermore, the viscosities of these products, while remaining substantially within the viscosity range prescribed above, increase continuously on storage, for example from an original viscosity, at about 25° C., of less than 50 cps. for certain compositions to viscosities of up to several hundred cps. in a period of three to six months. This continuous and irregular viscosity variation results in the production from otherwise identically prepared polyisocyanate compositions, under identical foaming conditions, of urethane foam polymers possessing altogether different and generally unpredictable physical properties.

It is therefore an object of my invention to provide polyisocyanate compositions comprising tolylene diisocyanate solutions of congeneric polyisocyanate solutes, said compositions having an amine equivalent in the range of about 90 to about 125, which do not undergo pronounced variations in their viscosities on standing and which remain devoid of solid agglomerates on prolonged storage.

Other objects and advantages of my invention will become apparent from the following detailed description thereof.

I have discovered that polyisocyanate compositions comprising tolylene diisocyanate solutions of congeneric solutes, said compositions having an amine equivalent in the range of about 90 to about 125, and preferably, about 100 to 115, have excellent storage stability, i.e. do not undergo pronounced increases in viscosity and do not deposit solid agglomerates on prolonged storage, can be prepared by phosgenating a toluene-diamine mixture containing less than about 1.5 weight percent ortho toluenediamines. Such a toluenediamine mixture may be derived by submitting a toluenediamine mixture as obtained by reduction of the dinitration product of toluene to a topping operation whereby the ortho toluenediamine content of the toluenediamine mixture is reduced to 1.5 percent by weight or less, preferably, to about 0.3 to about 0.8, by an operation, such as disclosed in copending application of Kirss and Park, Ser. No. 456,215, filed May 17, 1965, now U.S.P. 3,420,752.

Preferably, the toluenediamine mixture, in which the concentration of ortho toluenediamines has been reduced to 1.5 weight percent or less, is converted to a polyisocyanate composition having a storage stability heretofore unencountered in undistilled toluenediamine phosgenation residues, by submitting said toluenediamine mixture to a phosgenation process comprising the following steps:

(1) Mixing said toluenediamine mixture with phosgene and an inert diluent, preferably ortho dichlorobenzene, at a temperature of about −20 to about 100° C. in a phosgene to toluenediamine ratio of about 2.3 to 1 to about 6 to 1 and a diluent to diamine ratio of about 2 to 1 to about 20 to 1, so as to form a reactant composition consisting essentially of a mixture of toluene carbamyl chlorides and the inert diluent;

(2) Heating said reactant composition in the presence of an excess of phosgene to a temperature, generally about 100-200° C., sufficient to convert said mixture of toluene carbamyl chlorides to a corresponding mixture of tolylene diisocyanates;

(3) Removing unreacted phosgene and hydrogen chloride product by distilling a small amount, about 10 percent of the total charge at about 760 mm. Hg or lower;

(4) Removing the inert diluent by vacuum distillation at about 50 mm. Hg or lower;

(5) Optionally distilling tolylene diisocyanates from the degassed and solvent-free phosgenation product until a distilland is obtained in the form of a commercially valuable polyisocyanate composition characterized by having an amine equivalent between about 90 and about 125, and (6) Filtering said distilland to remove any precipitated or suspended solid particles.

The distilland obtained in accordance with the above procedure comprising essentially a tolylene diisocyanate solution of non-volatile congeneric solutes, derived by phosgenating a toluenediamine mixture in which the ortho toluenediamine concentration has been reduced to less than about 1.5 percent by weight, is characterized by having an amine equivalent between about 90 and about 125. Further characteristics of the distilland, which are dependent upon the amine equivalent, include (a) a weight concentration of hexane insoluble congeneric solutes of about 2 to about 55 percent, generally between about 20 and 55 percent; (b) a viscosity, at 25° C., in the range of about 5 to about 10,000 cps., generally between about 20 and 10,000 cps., and preferably, between about 20 and 250 cps.; and (c) a recoverably tolylene diisocyanate content of at least about 45 percent, generally between about 45 and about 80 percent, by weight, based on the weight of the distilland, as measured in a gas chromatograph.

The distilland is further characterized in that its infrared absorption spectrum does not contain an absorption peak at about 7.37 microns which corresponds to an absorbance in excess of 0.15, when an infra-red spectrum is taken of a 20 percent solution of a polyisocyanate composition of my invention in benzene using a cell path 0.1 mm. wide on a Baird 2R spectrophotometer, Model 455 or a similar double-beam instrument. The term absorbance as employed herein is defined as log $(I_o/I_s)$, where $I_o$ and $I_s$ are the percent transmittances at 7.37 microns of benzene and of the polyisocyanate solution respectively, under identical experimental conditions.

As expressed previously, the novel polyisocyanate compositions of my invention exhibit an unusual storage stability, that is, a polyisocyanate composition of my invention does not undergo, on standing, transformations which cause a marked increase in its viscosity; neither will such a polyisocyanate composition deposit a sediment or a solid agglomerate on prolonged storage, for example for at least one month and preferably in excess of six months.

The storage stability of the polyisocyanate compositions of my invention is an inverse function of the ortho toluenediamine content of the original toluenediamine mixture. For example, a polyisocyanate composition derived from a toluenediamine mixture containing more than about 3 percent by weight of ortho toluenediamines will contain a solid mass almost immediately upon preparation. Conversely a toluenediamine mixture containing about 0.5 percent by weight ortho toluenediamines yields a polyisocyanate composition which does not deposit any solid contaminants even after about six months. The effect of ortho toluenediamine content in toluenediamine mixtures on the storage stability of the polyisocyanate compositions derived therefrom is illustrated in Table I. As already stated, the practice of the art was to phosgenate toluenediamine mixtures derived by reduction of the dinitration products of toluene. Such toluenediamine mixtures normally contain from about 1.8 to about 4.2 percent by weight of ortho toluenediamines the presence of which I found induced the undesirable properties of deposition of sediment and marked change in viscosity upon prolonged storage of the polyisocyanate composition produced by phosgenation.

TABLE I.—EFFECT OF ORTHO TOLUENEDIAMINE CONCENTRATION IN TOLUENEDIAMINE MIXTURES ON THE STORAGE STABILITY OF THE POLYISOCYANATE COMPOSITIONS DERIVED THEREFROM

| Concentration of ortho isomer, percent | Viscosity of polyisocyanate | | First instance of sediments |
|---|---|---|---|
| | Initial | After 31 days | |
| 3 | 72 | 80 | Less than 1 week. |
| 1.5 | 60 | 68 | After about 1 month. |
| 0.5 | 39 | 43 | After about 6 months. |

By materially reducing the ortho toluenediamine content to a value less than 1.5%, preferably less than 0.5%, in a toluenediamine mixture prior to phosgenation, the polyisocyanate composition of my invention is stable, i.e. does not deposit sediment and does not materially increase in viscosity on prolonged storage.

To prepare the polyisocyanate compositions of my invention I phosgenate a meta toluenediamine mixture containing less than about 1.5 percent, generally from about 0.3 to about 1.5 percent, preferably less than about 1 percent and especially from about 0.3 to about 0.8 percent, by weight, of ortho toluenediamines in the presence of a solvent which is considerably more volatile than tolylene diisocyanate and which can be removed completely from the phosgenation mass by fractional distillation. The concentration of congeneric solutes in the polyisocyanate compositions of my invention is dependent in part upon the phosgenation conditions. It can also be decreased or augmented by varying the amount of tolylene diisocyanate removed from the phosgenation mass by distillation. The process of my invention may be conducted continuously or as a batch process using conventional phosgenation and distillation equipment.

If in the operation of the process of my invention it is desired to produce considerable amounts of pure and salable tolylene diisocyanate, it is preferred to use process conditions conductive to the formation of limited amounts of polymeric congeneric solute components in the phosgenation mass, for example by phosgenating in a more dilute solution or at a slightly higher phosgenation temperature than would be employed otherwise. It then becomes possible to distill off from the phosgenation mass a considerable amount of tolylene diisocyanate while still recovering in the form of a distilland a polyisocyanate composition having a viscosity and an amine equivalent within the viscosity and the amine equivalent ranges specified above. Such a tolylene diisocyanate distillate is a valuable co-product of the process of my invention and may amount to as much as about one-half of the solvent free phosgenation mass. The formation of polymeric congeneric solutes in the distilland may also be minimized by the use of lower temperatures and faster throughput rates while conducting the distillation step of the process of my invention at reduced pressure, generally at a pressure of about 5 to 15 mm. Hg. It is generally inadvisable to remove substantially more than about 50% of the phosgenation products in the form of tolylene diisocyanate since the exposure of the phosgenation mixtures to inordinately long heating periods results in the occurence of complex transformations in the distilland which reduce it to a commercially unsuitable product.

The polyisocyanate compositions of my invention may be advantageously converted to rigid urethane foam polymers by blending with a mixture containing a polyether or a polyester component having a plurality of hydroxyl groups, a blowing agent, a catalyst, an emulsifier and, whenever desirable, a cross-linking agent, a dispersant, a colorant and the like. Alternately, the above-mentioned components including the polyisocyanate composition of my invention may be combined in a machine designed specifically for producing foam, which may discharge the foam mixture into a mold cavity of a prescribed shape.

The ratio of the polyisocyanate component to the various other components of the foam mixture may be varied widely depending partly upon the chemical nature of the polyether or polyester employed and partly upon the desired characteristics of the foam being produced. The blowing agent may be produced internally during the foaming operation, for example by the addition of water to produce carbon dioxide or it may be added in the form of a low boiling and inert organic compound or a mixture of such inert organic compounds. Suitable blowing agents which may be used in the production of useful foams from the polyisocyanate compositions of my invention may include any one or a mixture of chlorine and fluorine containing hydrocarbons such as trichlorofluoromethane, difluorodichloromethane, trifluoromonochloromethane, sym-tetrafluorodichloroethane and the like. Polyethers containing a plurality of hydroxyl groups per molecule, which may be successfully combined with the polyisocyanate compositions of my invention to produce urethane foam polymers of outstanding performance may be prepared by condensing a polyol such as glycerol, trimethylol propane and the like with an alkylene oxide such as ethylene oxide, propylene oxide and the like to produce a polyether containing a plurality of hydroxyl groups. Polyesters containing a plurality of hydroxyl groups may be obtained by esterification of some of the hydroxyl groups in the above-mentioned polyethers either with mono- or dibasic acids. Various catalysts and accelerators, for example tertiary amines such as triethylamine, ethylenediamine, triethylenediamine, N-methylmorpholine, triethanolamine, tripropanolamine and the like and certain organotin derivatives such as tributyltin acetate, dibutyltindichloride, tin hexanote, dibutyltin dilaurate and the like and various emulsifiers and dispersants, for example siloxane oxyalkane copolymers, polyoxyalkene polymers and copolymers, oil soluble sulfonate detergents and the like may be successfully employed in the conversion of the polyisocyanate compositions of my invention to useful urethane foam polymers.

ANALYTICAL PROCEDURES

Isocyanate equivalent weight or "amine equivalent"

Isocyanate equivalent weights are measured by an analytical procedure which involves reacting the isocyanate groups in the sample with n-dibutyl amine to form the corresponding urea groups and back titrating excess n-butylamine with HCl solution. The procedure is as follows: weight 6 to 8 grams of sample, dilute with 35 to 50 cc. of toluene, add 20 cc. of 2 N solution of dibutylamine in toluene, heat 5 to 10 minutes (do not boil), cool, add 100 cc. methanol, titrate with 1 N HCl solution to an end point pH of 4.2 to 4.5 using a pH meter, run a blank. The results may be calculated as either weight percent NCO group in the sample or as so-called "amine equivalent," i.e. the weight of sample containing 1 equivalent weight (42 grams of NCO group. The applicable equations are:

$$\text{Percent NCO} = 4.2(TB-TS)N/WS$$

$$AE = \frac{1000\ WS}{(TB-TS)N}$$

wherein:

AE=amine equivalent
WS=weight of sample in grams
TB=titration of blank in ml. HCl
TS=titration of sample in ml. HCl
N=normality of HCl

DETERMINATION OF TOTAL RECOVERABLE TOLYLENE DIISOCYANATE

Gas chromatograph data herein reported are made in a Perkin Elmer Model 188 Triplet Stage Vapor Fractometer using a vaporizer temperature of 250° C., "Fluoropak 80" column packing coated with silicon grease as a partition agent, and helium gas as an effluent. The analysis are carried out using trichlorobenzene as an internal standard. Chromatograph charts are obtained for two samples: (1) a reference mixture of tolylene diisocyanate and trichlorobenzene of known composition, and (2) a mixture of unknown and trichlorobenzene having a known trichlorobenzene content. The samples are introduced into the vaporizing chamber via a syringe and have a volume (which need not be measured) of one microliter or less. The ratio of sample sizes A introduced into the fractometer is determined from the chromatographs by the expression:

$$A = \frac{\text{Peak height trichlorobenzene in reference}}{\text{Peak height trichlorobenzene in unknown}}$$

The ratio of tolylene diisocyanate concentrations in reference sample and unknown, B, is determined from the chromatographs by the expression:

$$B = \frac{\text{Peak height tolylene diisocyanate in unknown}}{\text{Peak height tolylene diisocyanate in reference}}$$

The percent tolylene diisocyanate in the unknown is then given by the product ABC where C is the percent tolylene diisocyanate in the reference standard.

Polyisocyanate compositions characterizing the present invention have recoverable tolylene diisocyanate contents of at least about 45%, generally between about 45 and 80%, when measured by this procedure or equivalent.

Isolation of hexane insoluble solutes

The hexane insoluble solute fraction of the polyisocyanate compositions of my invention may be isolated in the form of a free-flowing solid by the following procedure: A 6 gm. sample of a polyisocyanate composition of my invention and about 360 ml. n-hexane is shaken vigorously for about 10 minutes. The mixture is permitted to settle. The bulk of the hexane is carefully decanted from the solid which separates out of the mixture, the remainder of the hexane being removed after submitting the residue to centrifugation. The remaining solid is shaken vigorously with a second hexane fraction, about 250 ml., and the resulting suspension is filtered. The precipitate is vacuum dried at about 50° C. to recover the solute fraction in the form of a free-flowing solid.

My invention is further illustrated by the following specific examples thereof. In the examples, parts and percentages are in parts and percentages by weight.

EXAMPLE 1

A toluenediamine mixture containing as analyzed by gas chromatography, about 1.8 percent ortho toluenediamines is subjected to a separating operation whereby the toluenediamine mixture is fractionally distilled at a temperature of about 181° C. and a pressure of about 70 mm. Hg in a distillation apparatus equipped with a fractionating column having an efficiency equivalent to 42 theoretical plates and equipped with a liquid divider operated at 25:11 reflux ratio. The distillation is interrupted when about 2 percent of the still-charge is collected in the form of a distillate, at which point the distillate fraction contains about 80 percent of the total ortho toluenediamine impurities and the toluenediamine distilland, which corresponds to about 98 percent of the total still-charge, contains about 0.46 percent ortho toluenediamines.

The distilland, dissolved in ortho dichlorobenzene, so as to form a 10 percent solution, is phosgenated using a phosgene to diamine ratio of about 4 to 1, initially at a temperature of about 20° C. which is gradually increased to a final temperature of about 175° C. to complete the phosgenation. The phosgenation mass is degassed with a rapid stream of dry nitrogen and is stripped of the ortho dichlorobenzene solvent. It is then fractionally distilled at a pressure of about 100 mm. Hg. to remove a mixture of essentially pure 2,4- and 2,6-tolylene diisocyanates amounting to about one-half of the total degassed and solvent-free phosgenation mass.

The residue is then filtered to yield a clear mobile polyisocyanate composition having an amine equivalent of about 107 and a viscosity of about 70 cps. at about 25° C. After storage for 60 days at room temperature, there is no indication of the separation from the clear mobile liquid of any solid particles.

EXAMPLE 2

A polyurethane foam is prepared from the polyisocyanate composition obtained in Example 1 by proceeding in the following manner: A premix is prepared by combining 100 parts of a polyoxypropylene polyol having a hydroxyl number of about 460 sold commercially as Actol 51–460 Polyol, 16 parts of a polyoxypropylene diethylene triamine adduct having a hydroxyl number of about 475 sold as NIAX LA–475 Polyol, 48 parts trichloromonofluoromethane blowing agent, 1.7 parts silicone surfactant, 1.8 parts N,N-dimethylethanolamine dispersant and 1.2 parts triethylene diamine catalyst. To the premix there is added 106 parts of the polyisocyanate composition prepared in Example 1. The reaction mixture is stirred during 13 seconds, it expands to maximum volume in about 91 seconds and becomes tack-free within about 120 seconds. A sample of the foam has a density of about 1.7 lb./cu. ft., a porosity equivalent to an open cell content of about 8 percent and a thermal conductivity corresponding to a "K" factor of about 0.115. For the foam sample, the compression load at yield is 10 p.s.i. and the compression load at 10 percent height deflection is 15.5 p.s.i. The outstanding dimensional stability of the foam is demonstrated by reference to Table II following Example 3.

EXAMPLE 3

A solution of a meta toluenediamine mixture containing about 0.46 percent ortho toluenediamines and prepared by a fractional distillation according to Example 1, in ortho dichlorobenzene corresponding to a meta toluenediamine concentration of about 10 percent is introduced into a reaction zone maintained at 60° C. Phosgene is simultaneously introduced into the same reaction zone at a ratio of about 4 moles phosgene for each mole diamine. The resultant slurry of toluene carbamyl chlorides containing excess phosgene flows from the first reaction zone into a second reaction zone maintained at a temperature of about 115° C. and finally into a third reaction zone maintained at a temperature of about 150° C. during which an excess of phosgene is continuously present. The reaction mixture flows from the third reaction zone into a continuous solvent stripping unit maintained at about 50 mm. Hg where the excess phosgene, byproduct hydrogen chloride and solvent are removed, and then into an evaporator where a portion, about 40 to 50 percent of the product consisting mainly of 2,4- and 2,6-tolylene diisocyanates is distilled off at a pressure of about 10 mm. Hg. The polyisocyanate residue is filtered and passes into a storage tank. A sample of a polyisocyanate composition prepared in this manner has an amine equivalent of 106.2, a viscosity of 40 cps. at 25° C., a content of hexane insoluble solutes of about 22 percent and an infra-red spectrum exhibiting at 7.37 microns an absorbance of 0.092.

TABLE II

| Test conditions: | Increase in volume |
|---|---|
| 24 hrs. at 70° C., 50% relative humidity | Less than 1%. |
| 24 hrs. at 110° C., 50% relative humidity | About 6%. |
| 24 hrs. at −30° C., 50% relative humidity | No change. |
| 72 hrs. at 38° C., 100% relative humidity | No change. |

Although certain preferred embodiments of the invention have been disclosed for purpose of illustration, it will be evident that various changes and modifications may be made therein without departing from the scope and spirit of the invention.

I claim:

1. A stable liquid polyisocyanate composition which does not deposit any sediment and which does not undergo marked increase in viscosity on prolonged storage, comprising essentially a tolylene diisocyanate solution of non-volatile congeneric solutes, derived by phosgenating a toluenediamine mixture in which the ortho toluenediamine concentration has been reduced to less than 1.5 percent by weight, said polyisocyanate composition having an amine equivalent in the range of about 90 to about 125, an infra-red spectrum showing at 7.37 microns, an absorbance not to exceed 0.15 and a storage stability such that said polyisocyanate composition remains without substantial increase in viscosity and remains in completely liquid form after storage for at least one month.

2. A liquid polyisocyanate composition as defined in claim 1 which is further characterized by having a viscosity in the range of about 5 to about 10,000 cps. at about 25° C., and a concentration of non-volatile congeneric solutes of about 2 to about 55 percent, by weight.

3. A composition as defined in claim 2 wherein the ortho toluenediamine concentration has been reduced to about 0.3 to 1.5 percent by weight, the viscosity is in the range of about 20 to about 10,000 cps. at 25° C., and the concentration of non-volatile congeneric solutes is about 20 to about 55 percent, by weight.

4. A liquid polyisocyanate composition as defined in claim 2 wherein the ortho toluenediamine concentration has been reduced to about 0.3 to about 0.8 percent by weight, the amine equivalent is in the range of about 100 to 115, the viscosity is in the range of about 20 to about 250 cps. at 25° C., and the concentration of non-volatile congeneric solutes is about 20 to about 55 percent, by weight.

References Cited

UNITED STATES PATENTS 3,215,652  11/1965  Kaplan _____ 260—453 XR
3,128,310   4/1964  Koch _____ 260—453 XR CHARLES B. PARKER, Primary Examiner D. H. TORRENCE, Assistant Examiner U.S. Cl. X.R.

260—2.5, 77.5, 580